(12) United States Patent
Mouridsen

(10) Patent No.: US 10,277,067 B2
(45) Date of Patent: Apr. 30, 2019

(54) POWER SUPPLY CONTROL

(71) Applicant: SCHNEIDER ELECTRIC IT CORPORATION, West Kingston, RI (US)

(72) Inventor: Jonas Sonsby Mouridsen, Odense V (DK)

(73) Assignee: SCHNEIDER ELECTRIC IT CORPORATION, West Kingston, RI (US)

( * ) Notice: Subject to any disclaimer, the term of this patent is extended or adjusted under 35 U.S.C. 154(b) by 128 days.

(21) Appl. No.: 15/032,691

(22) PCT Filed: Oct. 30, 2013

(86) PCT No.: PCT/US2013/067478
§ 371 (c)(1),
(2) Date: Apr. 28, 2016

(87) PCT Pub. No.: WO2015/065363
PCT Pub. Date: May 7, 2015

(65) Prior Publication Data
US 2016/0268839 A1    Sep. 15, 2016

(51) Int. Cl.
*H02M 1/42*    (2007.01)
*H02J 9/06*    (2006.01)
(Continued)

(52) U.S. Cl.
CPC .......... *H02J 9/062* (2013.01); *H02M 1/4208* (2013.01); *H02M 1/4225* (2013.01);
(Continued)

(58) Field of Classification Search
CPC ...... H02J 9/062; H02M 1/4208; H02M 7/487; H02M 1/4225; H02M 5/458; H02M 2001/0009; Y02B 70/126; Y02B 70/12
See application file for complete search history.

(56) References Cited

U.S. PATENT DOCUMENTS 4,443,841 A    4/1984    Mikami et al.
4,709,317 A *  11/1987   Iizuka .................. H02M 5/458
                                                        363/37
(Continued)

FOREIGN PATENT DOCUMENTS

CN    2363412 Y    2/2000
WO    2013070237 A1    5/2013
(Continued)

OTHER PUBLICATIONS

Notification of Transmittal of the International Search Report and Written Opinion of the International Searching Authority from corresponding PCT/US2013/067478 dated Mar. 27, 2014.
(Continued)

*Primary Examiner* — Jung Kim
(74) *Attorney, Agent, or Firm* — Lando & Anastasi, LLP (57) ABSTRACT

According to one aspect, embodiments of the invention provide a power supply system comprising an input configured to receive input power from an input power source, an output configured to provide output power to a load, a power factor correction circuit coupled to the input, an inverter coupled to the output, a bus coupled to the power factor correction circuit and the inverter, and a switching circuit coupled to the inverter, the switching circuit configured to direct power from the power factor correction circuit to the inverter when in a first mode of operation and from the bus to the inverter when in a second mode of operation.

20 Claims, 9 Drawing Sheets

(51) Int. Cl.
*H02M 5/458* (2006.01)
*H02M 7/487* (2007.01)
*H02M 1/00* (2006.01)

(52) U.S. Cl.
CPC ........... *H02M 5/458* (2013.01); *H02M 7/487* (2013.01); *H02M 2001/0009* (2013.01); *Y02B 70/126* (2013.01)

(56) References Cited

U.S. PATENT DOCUMENTS

| | | |
|---|---|---|
| 4,730,242 A | 3/1988 | Divan |
| 5,017,800 A | 5/1991 | Divan |
| 6,169,669 B1 | 1/2001 | Choudhury |
| 6,295,215 B1 | 9/2001 | Faria et al. |
| 6,944,035 B2 | 9/2005 | Raddi et al. |
| 7,050,312 B2 | 5/2006 | Tracy et al. |
| 7,295,451 B2 | 11/2007 | Charles |
| 7,446,433 B2 | 11/2008 | Masciarelli et al. |
| 7,508,094 B2 * | 3/2009 | Johnson, Jr. ............ H02J 9/062 307/64 |
| 7,615,891 B2 | 11/2009 | Wu et al. |
| 8,143,744 B2 | 3/2012 | Nielsen et al. |
| 8,816,533 B2 | 8/2014 | Navarro et al. |
| 9,531,288 B2 | 12/2016 | Bush et al. |
| 9,819,221 B2 | 11/2017 | Yang et al. |
| 2003/0048006 A1 | 3/2003 | Shelter et al. |
| 2005/0036248 A1 | 2/2005 | Klikic et al. |
| 2005/0201127 A1 | 9/2005 | Tracy et al. |
| 2005/0286274 A1 | 12/2005 | Pfitzer et al. |
| 2006/0138867 A1 | 6/2006 | Tian et al. |
| 2006/0152085 A1 | 7/2006 | Flett et al. |
| 2009/0196072 A1 | 8/2009 | Ye |
| 2009/0201703 A1 | 8/2009 | Klikic et al. |
| 2011/0031911 A1 | 2/2011 | Marcinkiewicz et al. |
| 2012/0074786 A1 | 3/2012 | Johnson, Jr. et al. |
| 2012/0119581 A1 | 5/2012 | Silberbauer et al. |
| 2012/0181871 A1 | 7/2012 | Johansen et al. |
| 2013/0076141 A1 | 3/2013 | Paulakonis et al. |
| 2016/0006295 A1 | 1/2016 | Yang et al. |
| 2016/0268839 A1 | 9/2016 | Mouridsen |
| 2017/0018959 A1 | 1/2017 | Yu et al. |
| 2017/0163086 A1 | 6/2017 | Bach |

FOREIGN PATENT DOCUMENTS

| | | |
|---|---|---|
| WO | 2013/151528 A1 | 10/2013 |
| WO | 2014044089 A1 | 3/2014 |
| WO | 2015065363 A1 | 5/2015 |

OTHER PUBLICATIONS

Extended European Search Report from corresponding European Application No. 13896699.9 dated Apr. 20, 2017.
Received STIC search report from EIC2800 searcher Mesfin Getaneh on Jun. 30, 2017.
Received STIC search report from EIC2800 searcher Samir Patel on Jun. 30, 2017.
Received STIC search report from EiC 2800 searcher John DiGeronimo on Jul. 24, 2018.

* cited by examiner

POWER SUPPLY CONTROL

CROSS-REFERENCE TO RELATED APPLICATIONS

This application is a U.S. National Stage Application under 35 U.S.C. § 371 of International Application No. PCT/US2013/067478, filed Oct. 30, 2013, titled POWER SUPPLY CONTROL, which is hereby incorporated herein by reference in its entirety.

BACKGROUND

1. Field of the Disclosure

Embodiments of the present disclosure relate generally to systems and methods for providing power.

2. Description of Background

A power supply, such as an uninterruptible power supply (UPS) is typically used to provide power to an electrical device, or load. A UPS can provide power while a primary power source, or mains, is unavailable. A conventional online UPS rectifies input power provided by an electric utility using a power factor correction circuit (PFC) to provide power to a DC bus. The rectified DC voltage is typically used to charge a battery while mains power is available, as well as to provide power to the DC bus. In the absence of mains power, the battery provides power to the DC bus. From the DC bus, an inverter generates an AC output voltage to the load. Since the DC bus is powered either by mains or the battery, the output power of the UPS is uninterrupted if the mains fails and the battery is sufficiently charged.

SUMMARY

At least some aspects and embodiments are directed toward a power supply system comprising an input configured to receive input power from an input power source, an output configured to provide output power to a load, a power factor correction circuit coupled to the input, an inverter coupled to the output, a bus coupled to the power factor correction circuit and the inverter, and a switching circuit coupled to the inverter, the switching circuit configured to direct power from the power factor correction circuit to the inverter when in a first mode of operation and from the bus to the inverter when in a second mode of operation.

According to one embodiment, the switching circuit is configured to direct an alternating current from the power factor correction circuit to the inverter when in the first mode of operation, bypassing the bus. In another embodiment, the power supply system further comprises energy storage component coupled to the bus. In one embodiment, the controller is further configured to direct current to and from the energy storage component. According to another embodiment, the power supply system comprises an uninterruptible power supply (UPS).

According to another embodiment, the power supply system further comprises a controller coupled to the switching circuit and configured to provide control signals to the switching circuit. In one embodiment, the controller is configured to monitor at least one environmental parameter of the power supply system, and provide control signals to operate the switching circuit in at least one of the first mode of operation, the second mode of operation, and a combination of the first and second modes of operation, based on the at least one environmental parameter. In another embodiment, in providing control signals to operate the switching circuit, the controller is further configured to provide control signals to the switching circuit to regulate input power and output power of the power supply system to desired levels based on the at least one environmental parameter. In one embodiment, in providing control signals to operate the switching circuit, the controller is further configured to provide control signals to the switching circuit to adjust a duty-cycle of the switching circuit to control an amount of power being transferred between the power factor correction circuit, the bus, and the inverter.

According to one embodiment, the controller is further configured to monitor an input current of the power factor correction circuit, determine whether the input current of the power factor correction circuit is less than an expected inverter output current level, and provide, in response to determining that the input current of the power factor correction circuit is less than the expected inverter output current level, control signals to operate the switching circuit to direct current from the bus to the inverter to boost an output current of the inverter.

Another aspect is directed to a method of controlling a power supply system comprising an input configured to receive input power from an input power source, an output configured to provide output power to a load, a power factor correction circuit coupled to the input, an inverter coupled to the output, a bus coupled to the power factor correction circuit and the inverter, a switching circuit coupled to the inverter, and a controller, the method comprising determining one or more environmental parameters of the power supply system, and based on determining, providing control signals to operate the switching circuit in one of a first mode of operation to direct power from the power factor correction circuit to the inverter or a second mode of operation to direct power from the bus to the inverter.

According to one embodiment, operating the switching circuit in the first mode of operation comprises directing an alternating current from the power factor correction circuit to the inverter, bypassing the bus. In another embodiment, providing control signals includes providing control signals to operate the switching circuit in at least one of the first mode of operation, the second mode of operation, and a combination of the first and second modes of operation based on the one or more environmental parameters.

According to another embodiment, providing control signals includes providing control signals to the switching circuit to regulate input power and output power of the power supply system to desired levels based on the one or more environmental parameters. In one embodiment, providing control signals includes providing control signals to the switching circuit to adjust a duty-cycle of the switching circuit to control an amount of power being transferred between the power factor correction circuit, the bus, and the inverter.

According to one embodiment, determining one or more environmental parameters comprises receiving an input voltage value and an output voltage value and determining whether the input voltage value and the output voltage value are substantially the same, and providing control signals comprises providing, in response to determining that the input voltage value and the output voltage value are substantially the same, control signals to operate the switching circuit in the first mode of operation.

According to another embodiment, determining one or more environmental parameters comprises monitoring an input current of the power factor correction circuit and providing control signals comprises determining whether the input current of the power factor correction circuit is less than an expected inverter output current level and providing, in response to determining that the input current of the power factor correction circuit is less than the expected inverter output current level, control signals to operate the switching circuit to direct current from the bus to the inverter to boost an output current of the inverter.

According to one embodiment, the power supply system further comprises an energy storage component coupled to the bus, the method further comprising directing current to and from the energy storage component. According to another embodiment, the power supply system comprises an uninterruptible power supply (UPS).

One aspect is directed to a power supply system comprising an input configured to receive input power from an input power source, an output configured to provide output power to a load, a power factor correction circuit coupled to the input, an inverter coupled to the output, a bus coupled to the power factor correction circuit and the inverter, and means for operating the power supply system in a hybrid mode to generate desired input and output power of the power supply system, the hybrid mode at least partially bypassing conversion of power from AC to DC.

Still other aspects, embodiments, and advantages of these exemplary aspects and embodiments are discussed in detail below. Embodiments disclosed herein may be combined with other embodiments in any manner consistent with at least one of the principles disclosed herein, and references to "an embodiment," "some embodiments," "an alternate embodiment," "various embodiments," "one embodiment" or the like are not necessarily mutually exclusive and are intended to indicate that a particular feature, structure, or characteristic described may be included in at least one embodiment. The appearances of such terms herein are not necessarily all referring to the same embodiment.

BRIEF DESCRIPTION OF THE DRAWINGS

Various aspects of at least one embodiment are discussed below with reference to the accompanying figures, which are not intended to be drawn to scale. The figures are included to provide illustration and a further understanding of the various aspects and embodiments, and are incorporated in and constitute a part of this specification, but are not intended as a definition of the limits of the disclosure. In the figures, each identical or nearly identical component that is illustrated in various figures is represented by a like numeral. For purposes of clarity, not every component may be labeled in every figure. In the figures.

DETAILED DESCRIPTION

A UPS system typically includes an input for receiving an input AC power, a power factor correction (PFC) circuit, which converts the AC power to DC power, a DC bus, an inverter, which converts the DC power back to AC power, and an output, which provides output AC power Z At least some aspects and embodiments are directed to methods and apparatuses for a hybrid mode of a UPS, which guides power directly from the PFC circuit to the inverter, bypassing conversion of power from AC to DC. The hybrid mode can provide an increase in efficiency, while still providing control of input current and output voltage as well as surge handling capability, which may not be available in a bypass mode or eco-mode.

One or more features disclosed herein may be implemented in one or more controllers or apparatuses configured to control one or more UPS systems. In various embodiments, controllers disclosed herein may be included in one or more UPS systems or may be separate from one or more UPS systems being controlled. Example UPS systems upon which various aspects may be implemented and example UPS systems which may be controlled based on various aspects are discussed in more detail below.

It is to be appreciated that embodiments of the methods and apparatuses discussed herein are not limited in application to the details of construction and the arrangement of components set forth in the following description or illustrated in the accompanying drawings. The methods and apparatuses are capable of implementation in other embodiments and of being practiced or of being carried out in various ways. Examples of specific implementations are provided herein for illustrative purposes only and are not intended to be limiting. In particular, acts, elements and features discussed in connection with any one or more embodiments are not intended to be excluded from a similar role in any other embodiment.

Also, the phraseology and terminology used herein is for the purpose of description and should not be regarded as limiting. Any references to embodiments or elements or acts of the systems and methods herein referred to in the singular may also embrace embodiments including a plurality of these elements, and any references in plural to any embodiment or element or act herein may also embrace embodiments including only a single element. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms.

Figure 1:
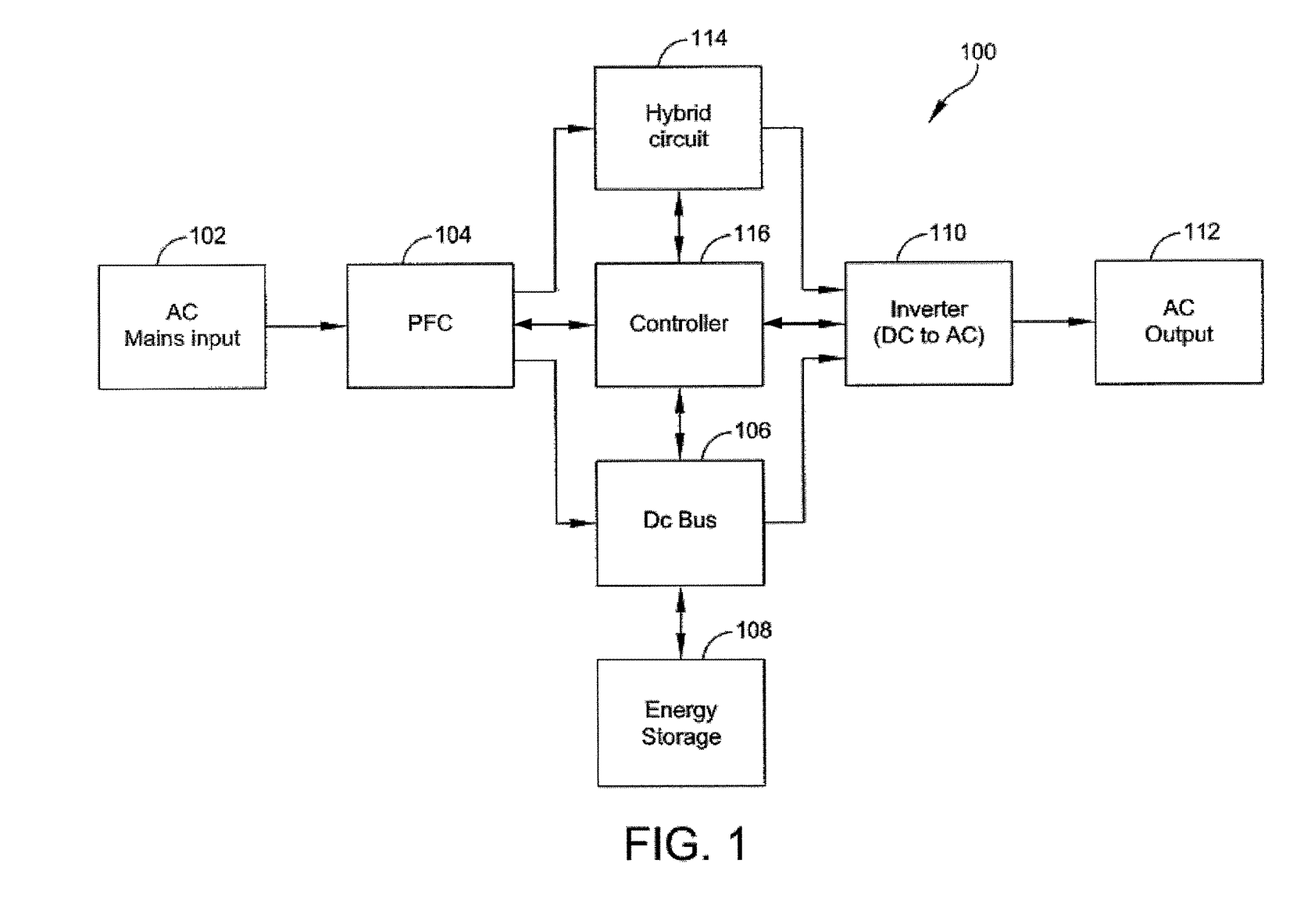
FIG. 1 is a block diagram of a UPS system according to aspects of the present disclosure.

FIG. 1 shows a block diagram depicting an uninterruptible power supply (UPS) 100. The uninterruptible power supply 100 includes an input 102, a power factor correction (PFC) circuit 104, a DC bus 106, a battery 108, an inverter 110, and an output 112. The UPS 100 also includes a hybrid circuit 114, which allows the UPS 100 to run in a hybrid mode and a controller 116, which provides instructions and commands to control the mode of the UPS 100.

In some embodiments, the input 102 receives power from an AC power source. The PFC circuit 104 filters and rectifies the AC power to convert the AC power into DC power, as well as provide power factor correction. Traditionally, the PFC circuit 104 provides the DC power to the DC bus 106. The battery 108 or other energy storage component can also provide power to the DC bus 106, which provides DC power to the inverter 110. The inverter converts the DC power into AC power for the output 112. In some embodiments, the hybrid circuit 114 bypasses the conversion of AC power to DC power. Thus, the hybrid circuit 114 bypasses the DC bus 106. In some embodiments, the hybrid circuit 114 allows the UPS 100 to run in the hybrid mode and also in a traditional mode, depending on a configuration and/or environmental parameters. Environmental parameters can include measureable characteristics of the input and output power, including electrical characteristics such as voltage, current, frequency, power quality, and other characteristics. For example, the hybrid circuit 114 can include switches that allow the UPS 100 to run in the traditional mode, converting AC power to DC power and utilizing the traditional components of the UPS 100.

The mode(s) in which the UPS 100 runs can be controlled by the controller 116 of the UPS 100. The controller 116 can receive inputs, such as environmental parameters and user inputs, which can determine whether the UPS 100 runs in a traditional mode, a hybrid mode, a bypass mode, other modes provided by the UPS 100, or some combination of modes. In hybrid mode, the controller 116 can allow current to pass through the hybrid circuit 114 as well as the DC bus 106 for portions of time depending on the environmental parameters. In some embodiments, the hybrid mode includes running in the traditional mode for portions of time. For example, the controller 116 can shift duty cycles of switches, as will be described further below, for varying amounts of time depending on the environmental parameters. In some embodiments, the controller 116 includes at least one processor or other logic device. In some embodiments, the controller 116 includes a digital signal processor (DSP). The controller 116 may also include at least one field programmable gate array (FPGA) and an application specific integrated circuit (ASIC), or other hardware, software, firmware, or combinations thereof. In various embodiments, one or more controllers may be part of the UPS 100, or external to but operatively coupled with the UPS 100.

In some embodiments, the controller 116 includes at least one control signal generator. The control signal generator may be part of the controller 116 or a separate device that outputs a control signal responsive, at least in part, to instructions from the controller 116. In some embodiments, the control signal generator includes at least one DSP and an FPGA. The control signal generator may generate, form, or otherwise output a control signal such as a pulse width modulation (PWM) control signal.

Figure 2:
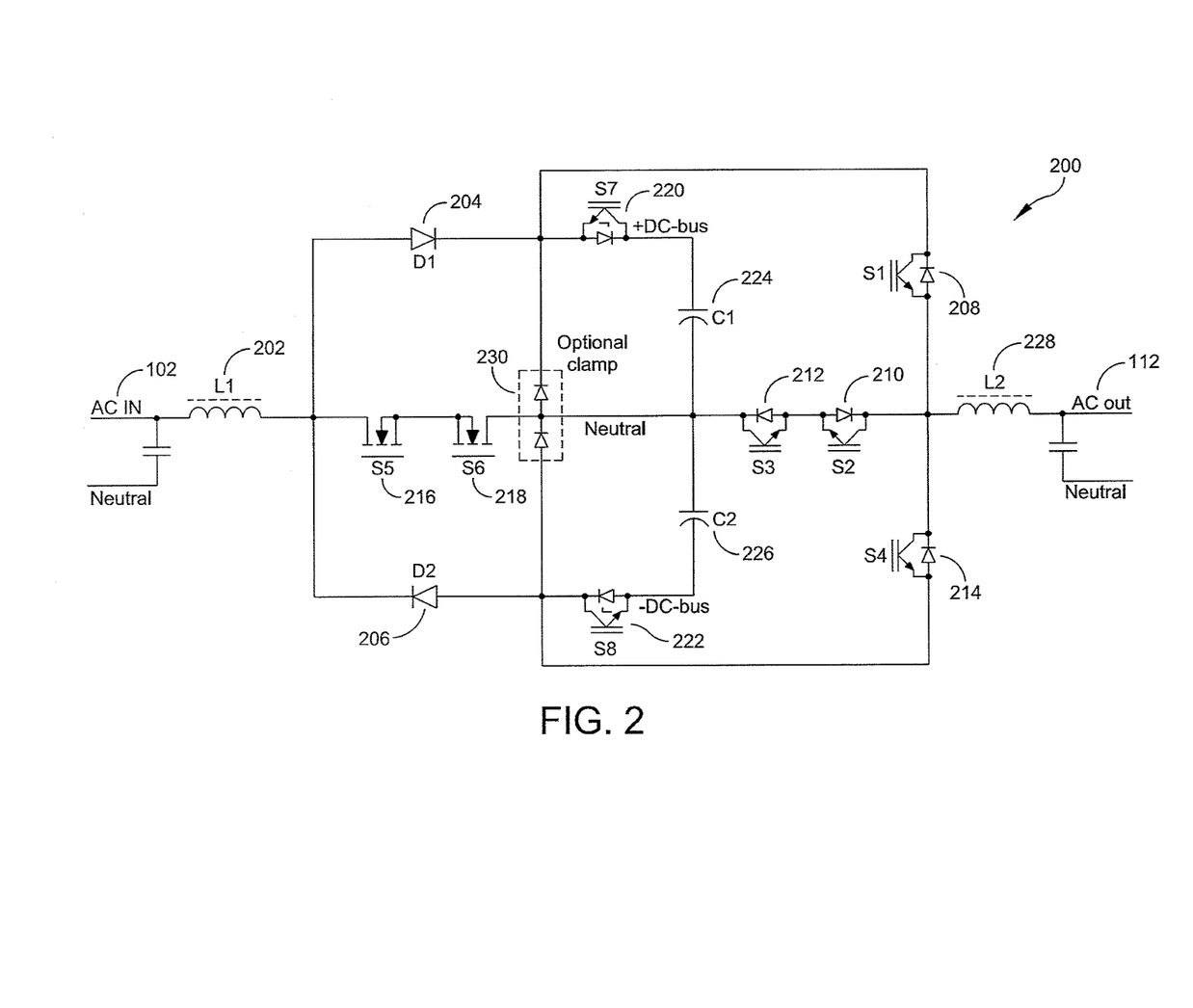
FIG. 2 is a circuit diagram of a portion of a UPS system according to aspects of the present disclosure.

FIG. 2 shows a diagram of an example circuit 200 of a portion of the UPS 100. The circuit 200 includes the input 102, which receives input AC power. The circuit 200 includes inductors L1 202 and L2 228, diodes D1 204 and D2 206, and a series of switches S1 208, S2 210, S3 212, S4 214, S5 216, S6 218, S7 220, and S8 222 which can control the flow of power through the circuit 200. In some embodiments, the switches S1-S8 208-222 are implemented as power transistors, such as metal oxide semiconductor field-effect transistors (MOSFETs) or insulated gate bipolar transistors (IGBTs). In some embodiments, two switches, S7 220 and S8 222, allow the UPS 100 to run in hybrid mode. Replacing the switches S7 220 and S8 222 with short circuits would result in a PFC circuit and a 3-level NPC-2 inverter. The switches S7 220 and S8 222 allow the circuit 200 to guide current from the PFC 104 to either the DC bus 106 (through switches S7 220 or S8 222 internal diode) or directly to the inverter 110 through switches S1 208 and S4 214. If the PFC input current is higher than inverter output current, excess current can flow to the DC bus 106 through switch S7 220. If the PFC input current is lower than inverter output current, switches S7 220 and S8 222 can be partially turned on to guide extra power from the DC bus 106 to the inverter output.

The input current to the PFC can be boosted and controlled by adjusting a duty cycle of switches S5 216 and S6 218. If input voltage is higher than output voltage, current can be limited by adjusting a duty cycle of S1 208 and S4 214. If the requested output current is higher than the input current, a duty cycle of S7 220 and S8 222 can be increased to draw power from the DC bus, boosting inverter output current to the requested level. Similarly, if input current is higher than output current, current from the PFC can freewheel to the DC bus through switches S7 220 and S8 222.

In some embodiments, when input voltage and output voltage are the same and load power factor is close to 1, S1 208 and S4 214 can remain almost constantly on and current can bypass the DC bus 106 for most of the time, which can minimize choke core losses and switching losses, as well as reduce conduction losses. The remaining switches, S5 216/S6 218, S7 220/S8 222 and S2 210/S3 212 can be turned on for short durations each switch cycle, to compensate for any differences in input and output current. The primary current path would then include D1 204 and S1 208 or D2 206 and S4 214, reducing junctions in the primary current path.

At a low output load power factor (e.g., a reactive load), the UPS 100 can operate in the traditional mode, directing current through the PFC circuit 104, the DC bus 106, and the inverter 110 by leaving S7 220 and S8 222 on. According to some embodiments, at a low output load power factor, the UPS 100 can also operate in the hybrid mode and partially guide power directly from the PFC input to the inverter output as current from the PFC input can automatically be divided between the DC bus 106 and the inverter 110. According to some embodiments, the UPS 100 can operate in both traditional and hybrid modes (by adjusting the duty cycles of the switches) to provide a desired output.

The hybrid circuit can be suitable for 208V and 400/480V systems. In some embodiments, in 400V systems, S2 210, S3 212, S5 216, S6 218, S7 220, and S8 222 are 600V rated components, while D1 204, D2 206, S1 208, and S4 214 are rated for 1200V breakdown voltage. In some embodiments, in 208V systems, all components are 600V rated. In some embodiments, the UPS 100 includes a separate DC-DC converter for providing power to and receiving power from the battery 108 to the DC-bus 106.

Figure 3:
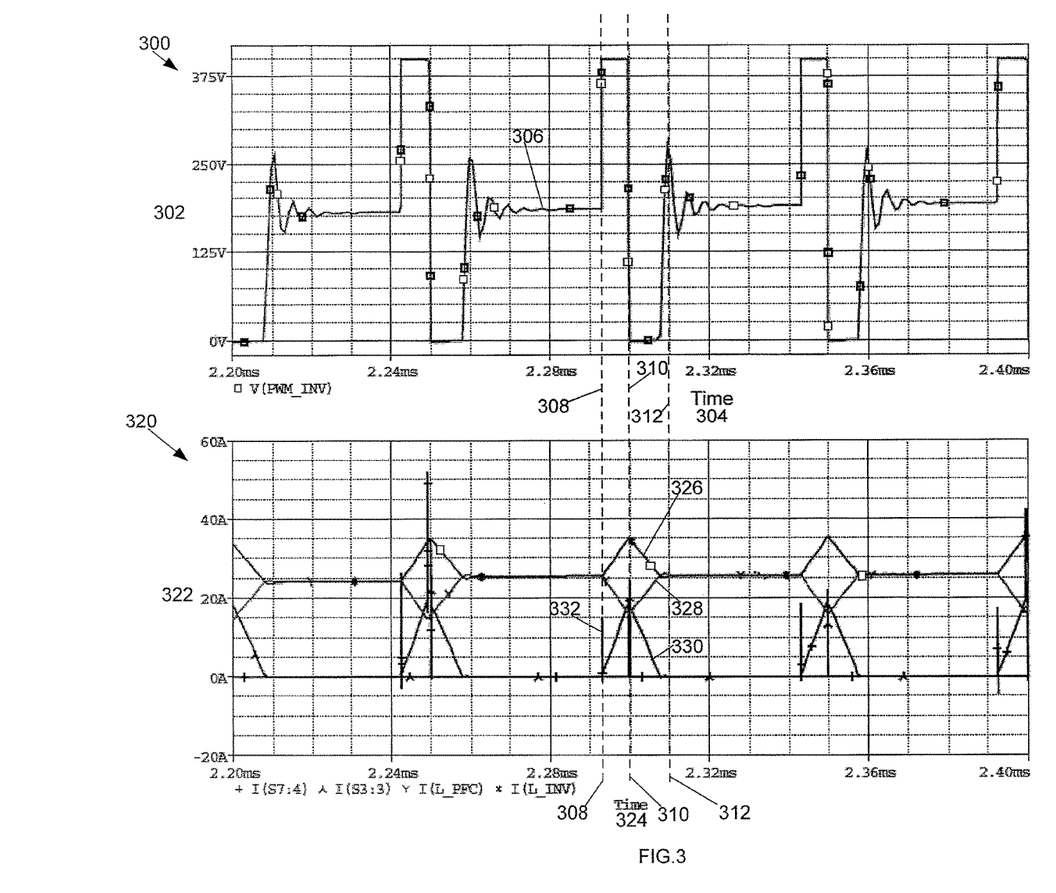
FIG. 3 includes graphs illustrating switching cycles of a UPS system according to aspects of the present disclosure.

FIG. 3 includes graphs 300 and 320 illustrating switching cycles of the UPS system 100. The y-axis of the first graph 300 represents voltage (in volts) and the x-axis of the first graph 300 represents time (in milliseconds). The trace 306 in the first graph 300 represents the Pulse Width Modulation (PWM) voltage of the inverter 110. The y-axis of the second graph 320 represents current (in Amps) and the x-axis of the second graph 320 represents time (in milliseconds). The first trace 326 in the second graph 320 represents inverter current of the UPS system 100. The second trace 328 in the second graph 320 represents PFC current of the UPS system 100. The third trace 330 in the second graph 320 represents current through switch S3 212. The fourth trace 332 in the second graph 320 represents current through switch S7 220.

At a first time 308, the switch S7 220 is turned on and the PWM voltage 306 of the inverter 110 increases. Assuming switch S1 208 is already turned on, the inverter current 326 is boosted with energy provided by the DC-bus 106 (via switch S7 220). At the same time, PFC current 328 freewheels through D1 204 and switch S7 220 to the DC-bus 106 and as a result, decreases.

At a second time 310, the switch S7 220 is turned off and current 332 through switch S7 220 goes to zero. As a result, the PWM voltage 306 of the inverter 110 drops to zero as the inverter current 326 free-wheels via switch S2 210 and switch S3 212 (e.g., as seen in the current 330 through switch S3 212 illustrated in the second graph 320). As the inverter current 326 drops and the PFC current 328 increases, at time 312 the inverter current 326 and the PFC current 328 equalize. Once the inverter current 326 and the PFC current 328 are equal, the PVM voltage 306 of the inverter 110 settles on an average value between the input and output voltage of the UPS 100. At this time, the voltage across the PFC 104 and the inverter 110 is virtually zero and hence the change in current is also close to zero. According to one embodiment, losses at this time are also very low.

Figure 4:
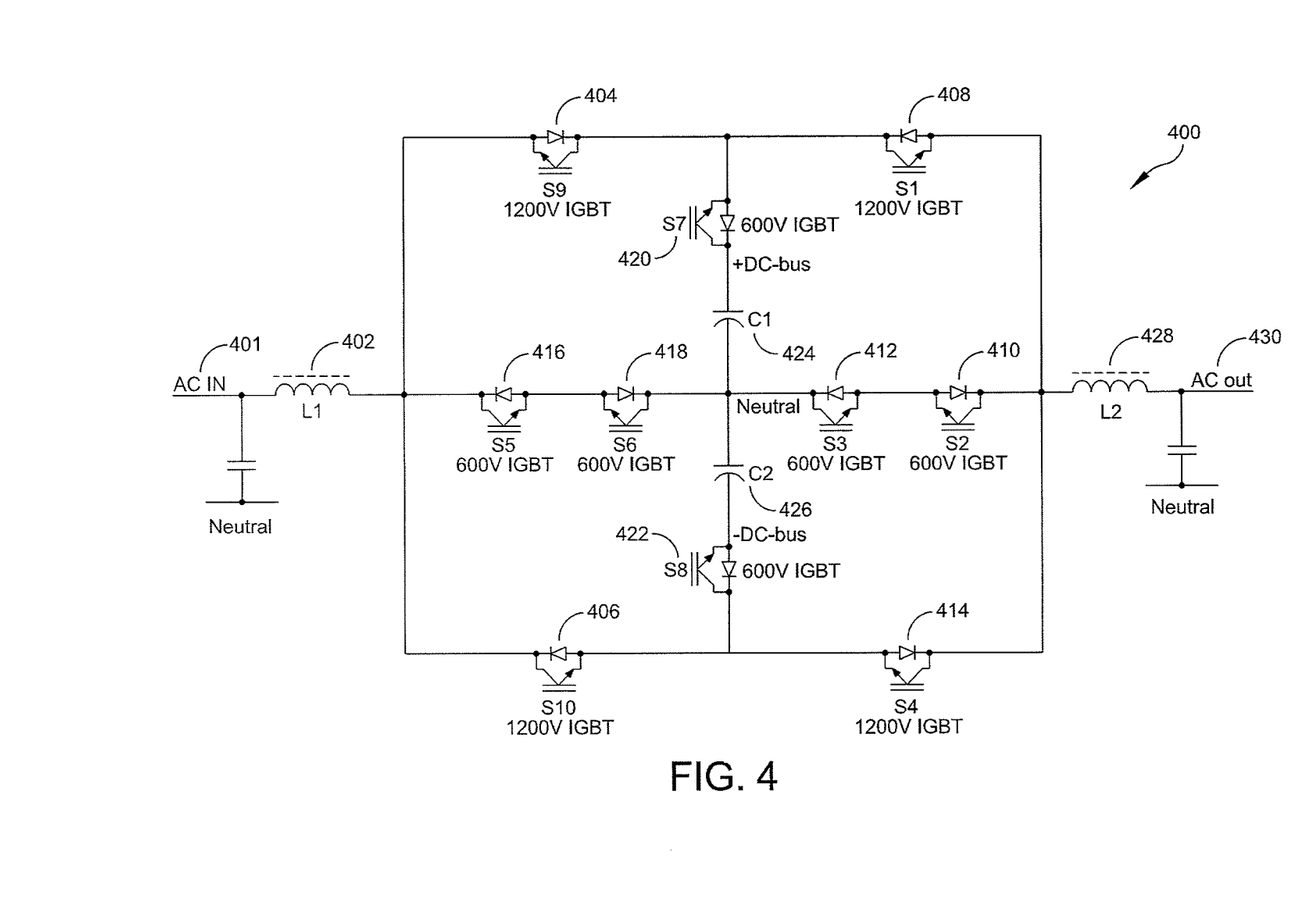
FIGS. 4-9 are circuit diagrams of a portion of a UPS system according to aspects of the present disclosure.

While the hybrid circuit 200 has been described with a specific topology, the bypassing of the DC bus can be achieved through various different topologies, with similar advantages as described above. Different embodiments of the disclosure provide power supplies in which power is directed from a PFC circuit to an inverter without fully converting AC power to DC power. For example, FIG. 4 shows a diagram of another example hybrid circuit 400 that can be used in the UPS 100. The hybrid circuit 400 is similar to the hybrid circuit 200 of FIG. 2, with diode D1 204 replaced with a switch S9 404 and diode D2 206 replaced with a switch S10 406. The remaining elements are the same, with inductors L1 402 and L2 428, capacitors C1 424 and C2 426, and switches 51 408, S2 410, S3 412, S4 414, S5 416, S6 418, S7 420, and S8 422. The switches serve similar functions as those of the hybrid circuit 200 of FIG. 2, with the switches S7 420 and S8 422 enabling the hybrid circuit to bypass the DC bus by guiding current through switches S1 408 and S4 414.

The switches S9 404 and S10 406 replacing the diodes enable bidirectional power flow with high efficiency in both directions through the hybrid circuit 400. Providing for high efficiency bidirectional power flow can be useful for applications such as motor drives and smart grids, which can allow smaller grids with power sources to provide or sell excess power to a larger grid.

Figure 5:
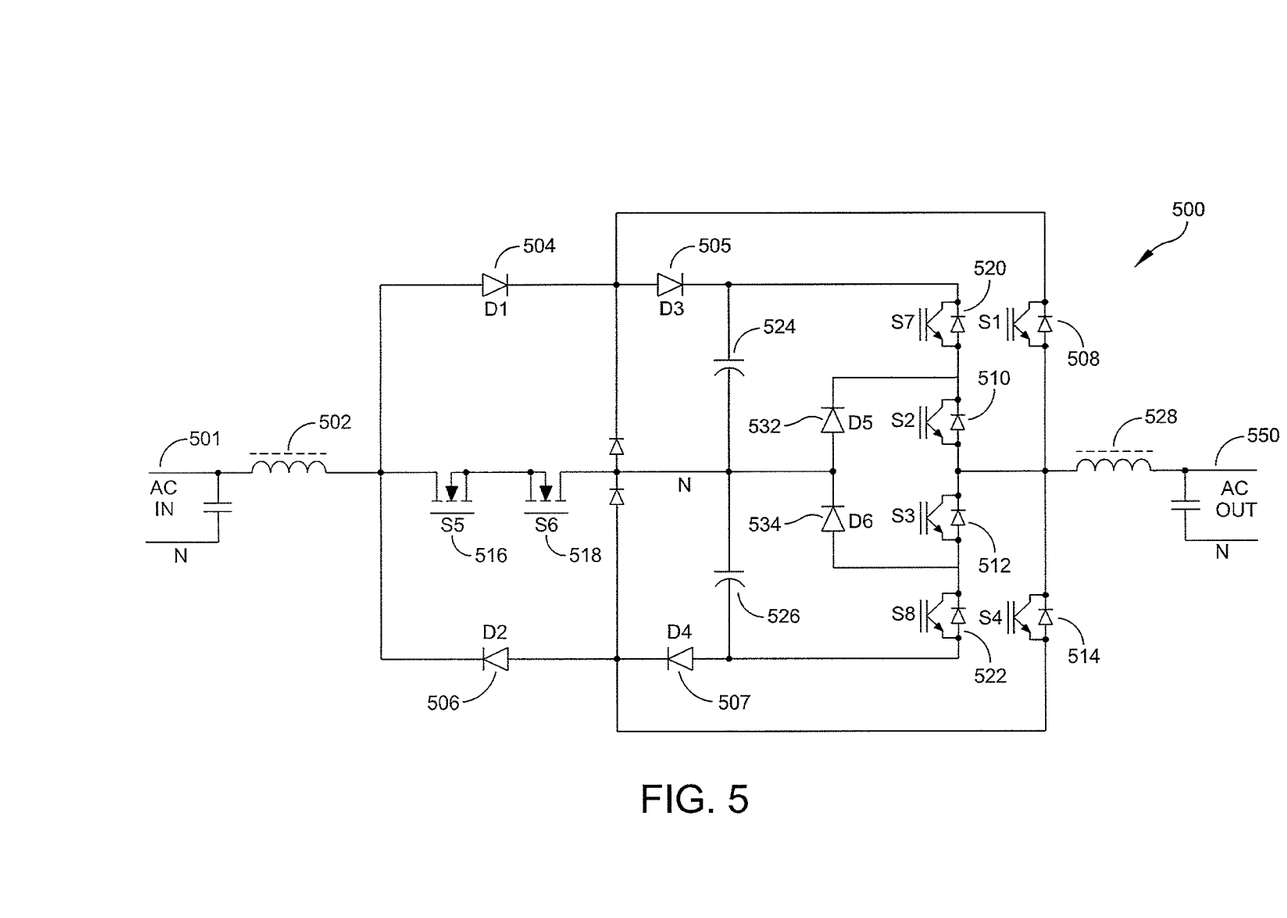

FIG. 5 shows a diagram of another example hybrid circuit 500 that can be used in the UPS 100. The hybrid circuit 500 is similar to the hybrid circuit 200 of FIG. 2, with additional diodes D3 505, D4 507, D5 532, and D6 534. The remaining elements are similar, with inductors L1 502 and L2 528, capacitors C1 524 and C2 526, and switches S1 508, S2 510, S3 512, S4 514, S5 516, S6 518, S7 520, and S8 522. The switches serve similar functions as those of the hybrid circuit 200 of FIG. 2, with the switches S1 508 and S4 514 enabling the hybrid circuit to bypass the DC bus by guiding current through switches S1 508 and S4 514. The additional diodes D3 505, D4 507, D5 532, and D6 534 are utilized in traditional mode, which can include double conversion, converting the power from AC to DC and back from DC to AC.

Figure 6:
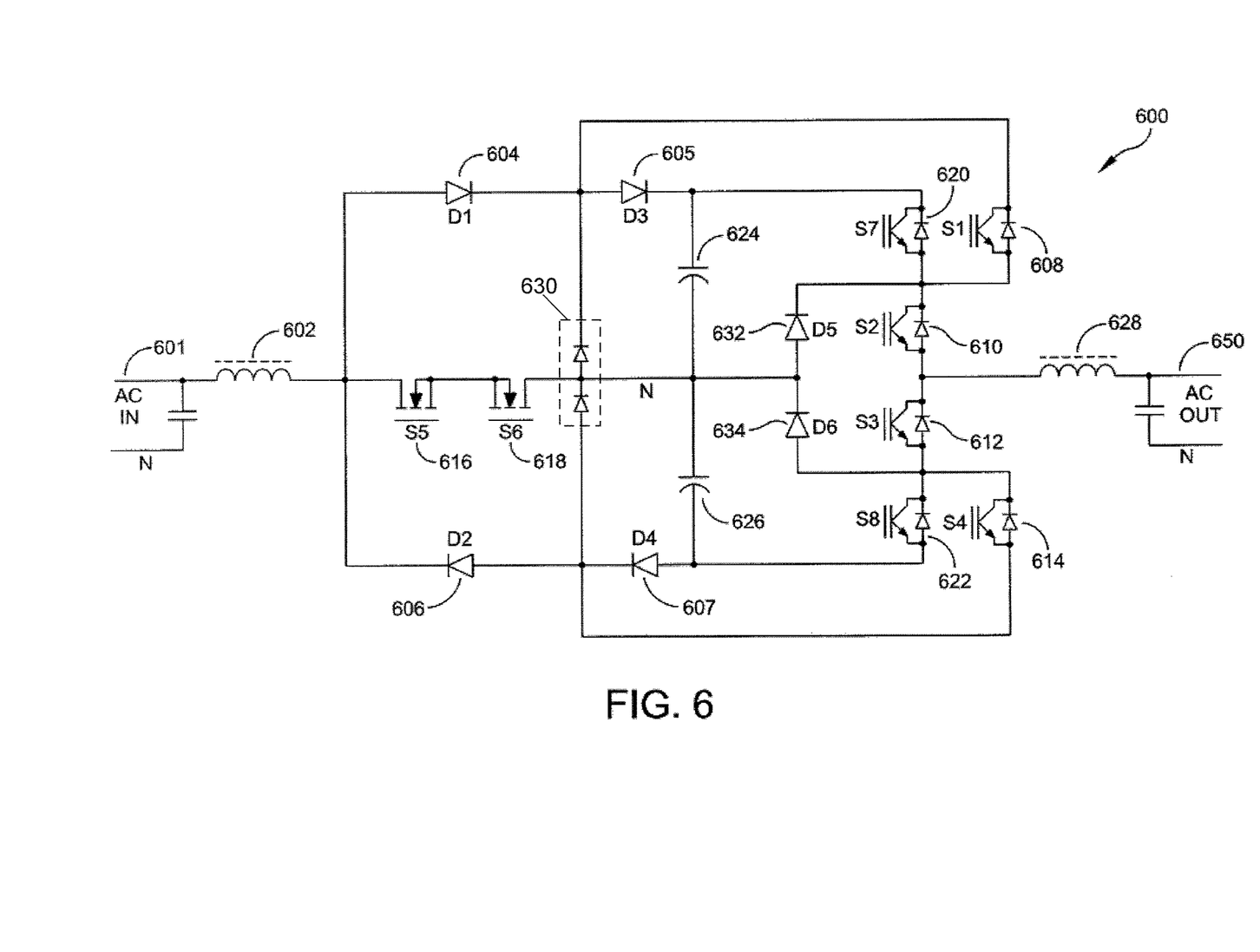

FIG. 6 shows a diagram of another example hybrid circuit 600 that can be used in the UPS 100. The hybrid circuit 600 is similar to the hybrid circuit 500 of FIG. 5. While the components are the same, the primary current path in hybrid mode is connected to additional switches, S2 610 and S3 612. Passing the current through the additional switches can allow the breakdown voltage of switches S1 608 and S4 614 to be reduced. In some embodiments, the breakdown voltages of all the switches S1-S8 are 600V, with the diodes D1 604 and D2 606 remaining at 1200V. The higher efficiency realized in traditional mode of the hybrid circuit 500 of FIG. 5 can be maintained in the hybrid circuit 600 as the remainder of the topology is the same.

Figure 7:
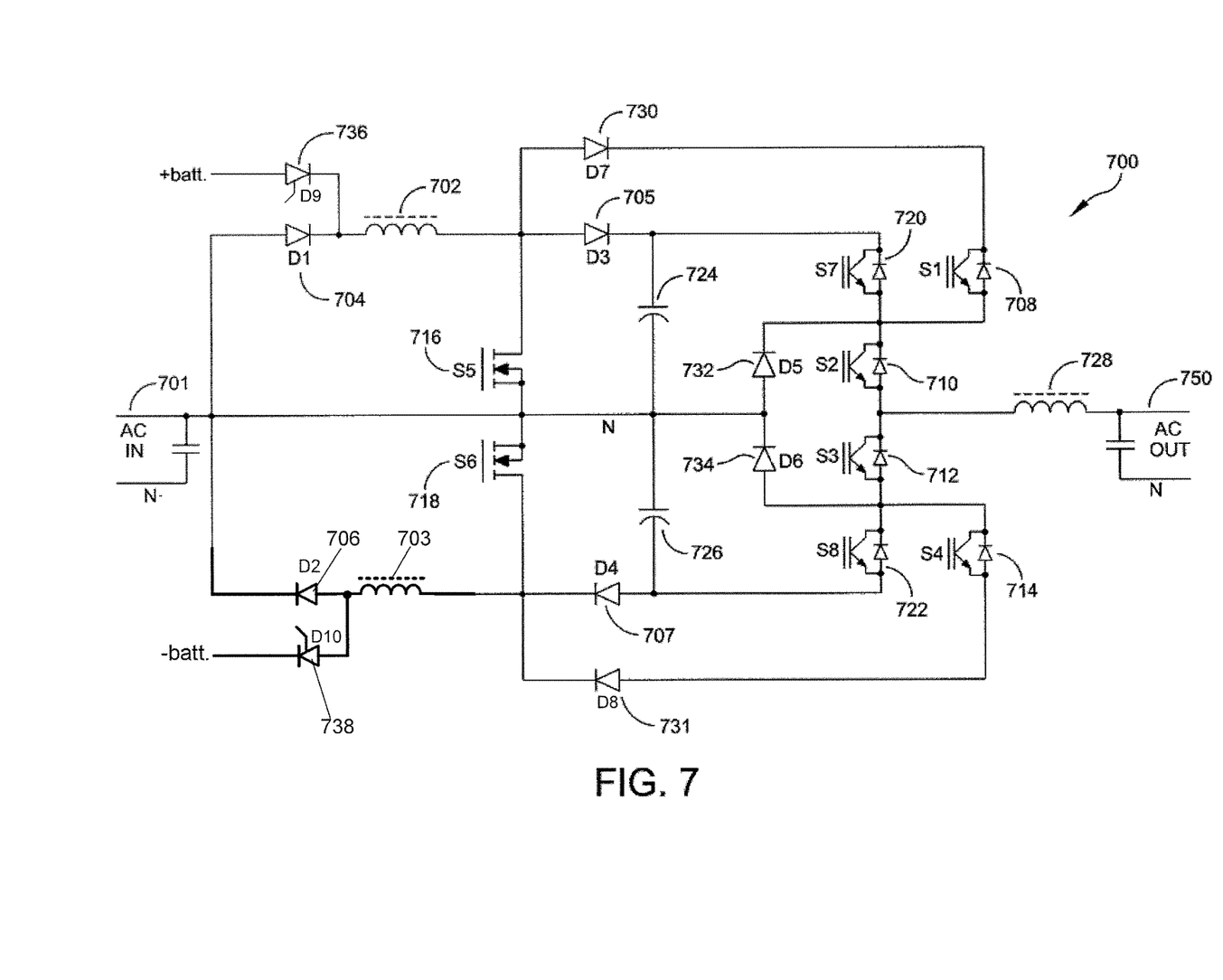

FIG. 7 shows a diagram of another example hybrid circuit 700 that can be used in the UPS 100. The hybrid circuit 700 is similar to the hybrid circuit 600 of FIG. 6, with additional diodes D7 730 and D8 731, additional thyristors D9 736 and D10 738, as well as additional inductor 702 and 703. The hybrid circuit 700 allows for battery input via the additional thyristors D9 736 and D10 738. The additional diodes D7 730 and D8 731 are in the primary current path for hybrid mode, resulting in four semiconductors and relatively higher conduction losses than, for example, the hybrid circuit 200 of FIG. 2. However, switching losses may be lower. The remaining components are similar to those of the hybrid circuit 600 of FIG. 6, except switches S5 716 and S6 718, which are repositioned to account for the additional inductor 703.

Figure 8:
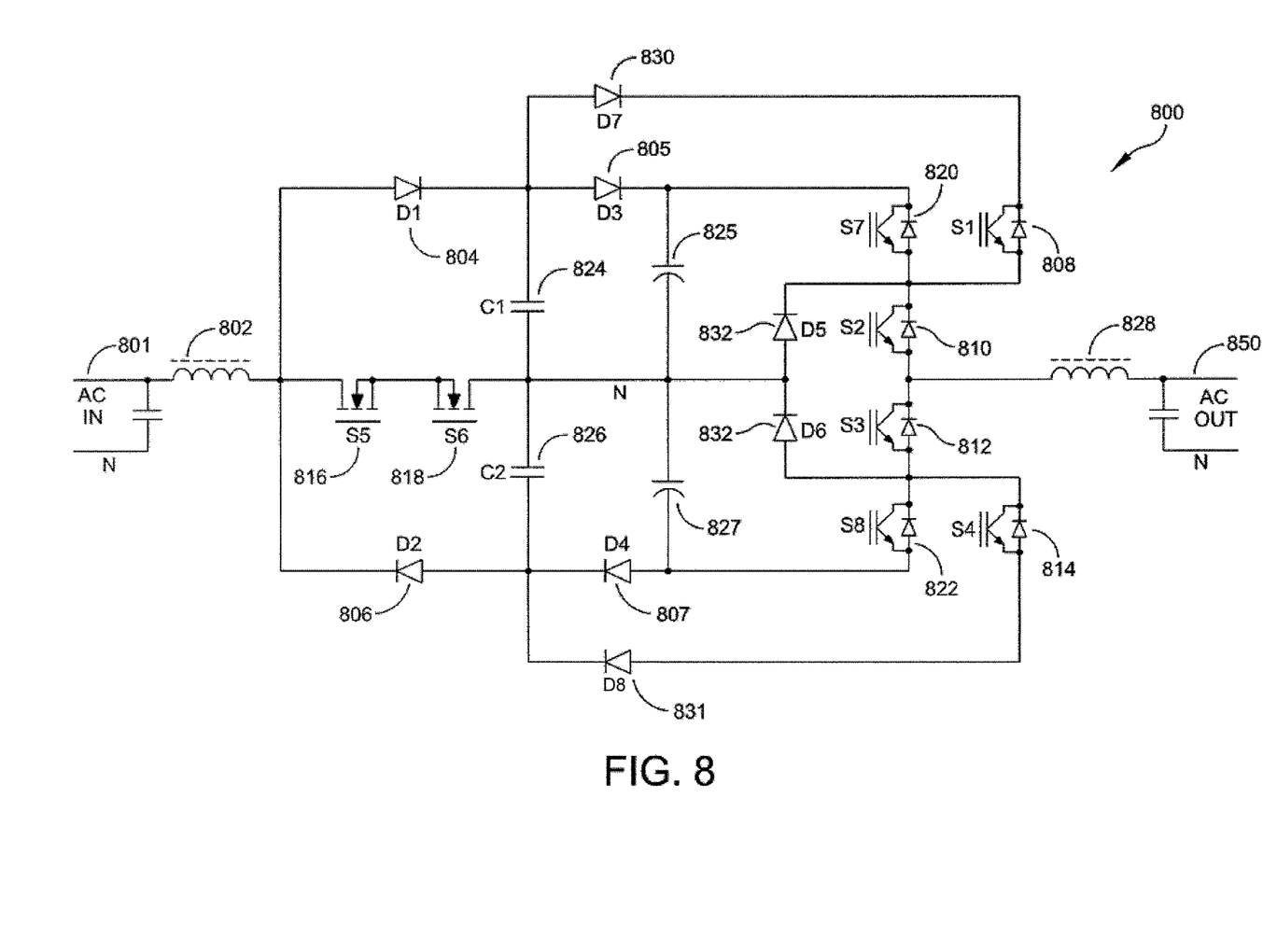

FIG. 8 shows a diagram of another example hybrid circuit 800 which can be used in the UPS 100. The hybrid circuit 800 is similar to the hybrid circuit 600 of FIG. 6, with additional diodes D7 830 and D8 831, as well as capacitors C1 824 and C2 826 instead of an optional clamp 630. The capacitors C1 824 and C2 826 provide for an extra variable voltage established prior to the DC bus, allowing the inverter to switch at a lower voltage. The capacitors C1 824 and C2 826 can also allow for easier control as the voltage across the capacitors can be used for regulation. The hybrid circuit 800 can also allow for the PFC circuit and the inverter not to have synchronized switching frequencies.

Figure 9:
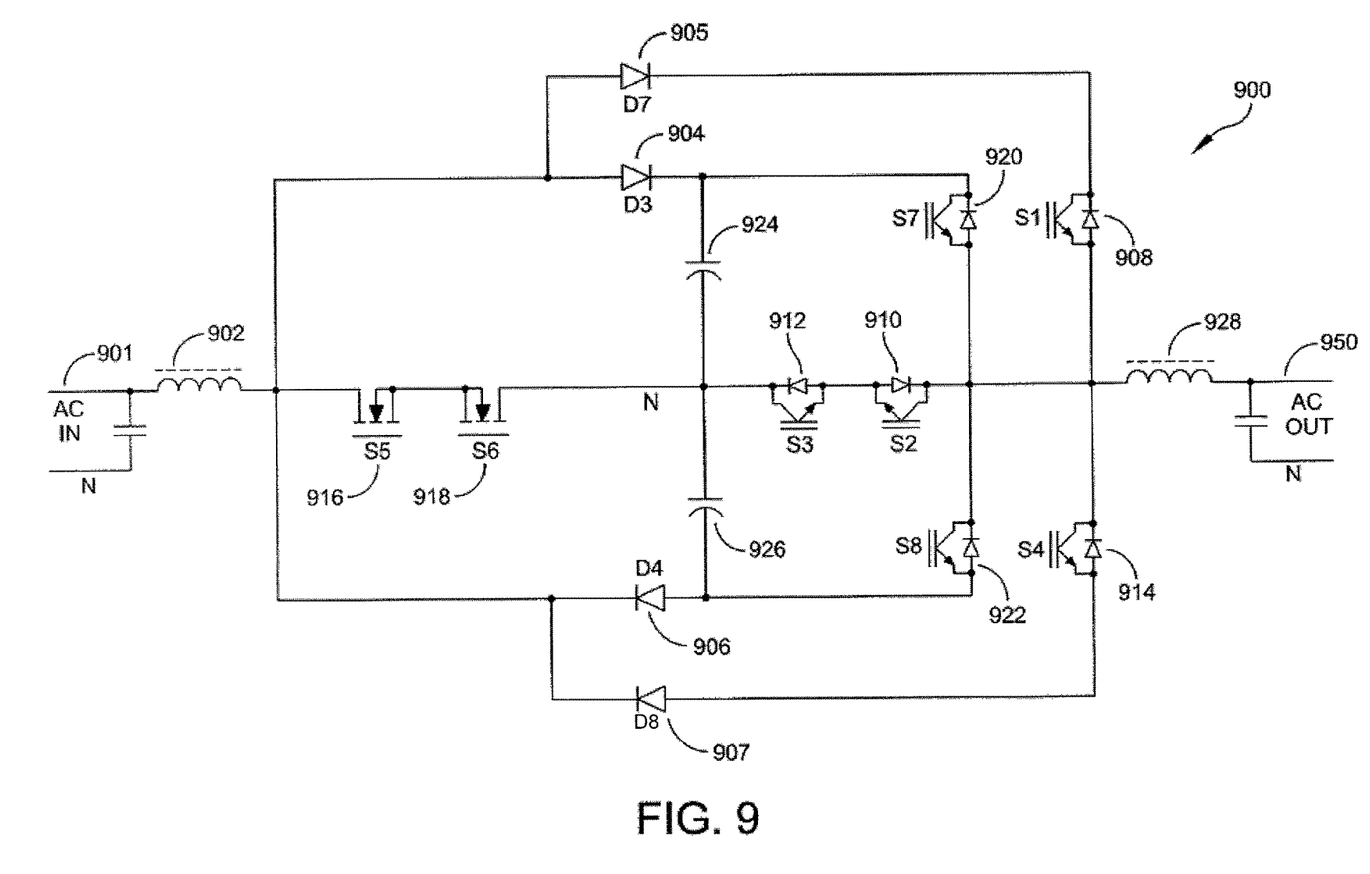

FIG. 9 shows a diagram of another example hybrid circuit 900 that can be used in the UPS 100. The hybrid circuit 900 is similar to the hybrid circuit 200 of FIG. 2, with additional diodes D7 905 and D8 907. The additional diodes D7 905 and D8 907 add extra components to the primary current path for the hybrid mode, but the hybrid circuit 900 can provide better efficiency in traditional operation.

While several example topologies have been discussed, numerous other topologies can implement the features of the disclosure, providing a hybrid mode that bypasses the DC bus and allows current to pass from the PFC circuit to the inverter circuit without AC to DC conversion. The hybrid mode allows the UPS to provide filtering and control of input current and output voltage, as well as surge handling capability.

Various aspects and functions described herein may be implemented in one or more controllers or apparatuses configured to control one or more UPS systems. In various embodiments, controllers disclosed herein may be included in one or more UPS systems or may be separate from one or more UPS systems being controlled.

At least some embodiments described above provide hybrid circuits in UPSs. In other embodiments the hybrid circuits may be used in types of power supplies and in other devices.

Furthermore, various aspects and functions described herein in accord with the present disclosure may be implemented as hardware, software, or a combination of hardware and software on one or more computer systems. The one or more computer systems may be configured to communicate with the one or more UPS systems being controlled. There are many examples of computer systems currently in use. Some examples include, among others, network appliances, personal computers, workstations, mainframes, networked clients, servers, media servers, application servers, database servers, web servers, and virtual servers. Other examples of computer systems may include mobile computing devices, such as cellular phones and personal digital assistants, and network equipment, such as load balancers, routers and switches. Additionally, aspects in accord with the present invention may be located on a single computer system or may be distributed among a plurality of computer systems connected to one or more communication networks.

For example, various aspects and functions may be distributed among one or more computer systems configured to provide a service to one or more client computers, or to perform an overall task as part of a distributed system. Additionally, aspects may be performed on a client-server or multi-tier system that includes components distributed among one or more server systems that perform various functions. Thus, the invention is not limited to executing on any particular system or group of systems. Further, aspects may be implemented in software, hardware or firmware, or any combination thereof. Thus, aspects in accord with the present invention may be implemented within methods, acts, systems, system placements and components using a variety of hardware and software configurations, and the invention is not limited to any particular distributed architecture, network, or communication protocol. Furthermore, aspects in accord with the present invention may be implemented as specially-programmed hardware and/or software.

Having described above several aspects of at least one embodiment, it is to be appreciated various alterations, modifications, and improvements will readily occur to those skilled in the art. Such alterations, modifications, and improvements are intended to be part of this disclosure and are intended to be within the scope of the disclosure. Accordingly, the foregoing description and drawings are by way of example only, and the scope of the disclosure should be determined from proper construction of the appended claims, and their equivalents.

What is claimed is:

1. A power supply system comprising:
   an input configured to receive input power from an input power source;
   an output configured to provide output power to a load;
   a power factor correction circuit coupled to the input;
   an inverter having an input connection coupled to the power factor correction circuit, and an output connection coupled to the output;
   a bus coupled to the power factor correction circuit and the inverter; and
   a switching circuit coupled to the inverter, the switching circuit configured to:
      direct AC power from the input to the input connection of the inverter, bypassing the bus, when in a first mode of operation; and
      simultaneously direct AC power from the input to the input connection of the inverter and DC power from the bus to the input connection of the inverter when in a second mode of operation.

2. The power supply system of claim 1, wherein the switching circuit is configured to direct an alternating current from the power factor correction circuit to the inverter when in the first mode of operation, bypassing the bus.

3. The power supply system of claim 1, further comprising a controller coupled to the switching circuit and configured to provide control signals to the switching circuit.

4. The power supply system of claim 3, wherein the controller is configured to:
   monitor at least one environmental parameter of the power supply system; and
   provide control signals to operate the switching circuit in at least one of the first mode of operation, the second mode of operation, and a combination of the first and second modes of operation, based on the at least one environmental parameter.

5. The power supply system of claim 4, wherein in providing control signals to operate the switching circuit, the controller is further configured to provide control signals to the switching circuit to regulate input power and output power of the power supply system to desired levels based on the at least one environmental parameter.

6. The power supply system of claim 4, wherein in providing control signals to operate the switching circuit, the controller is further configured to provide control signals to the switching circuit to adjust a duty-cycle of the switching circuit to control an amount of power being transferred between the power factor correction circuit, the bus, and the inverter.

7. The power supply system of claim 3, wherein the controller is further configured to:
   monitor an input current of the power factor correction circuit;
   determine whether the input current of the power factor correction circuit is less than an expected inverter output current level;
   and provide, in response to determining that the input current of the power factor correction circuit is less than the expected inverter output current level, control signals to operate the switching circuit to direct current from the bus to the inverter to boost an output current of the inverter.

8. The power supply system of claim 1, further comprising an energy storage component coupled to the bus.

9. The power supply system of claim 8, wherein the controller is further configured to direct current to and from the energy storage component.

10. The power supply system of claim 1, wherein the power supply system comprises an uninterruptible power supply (UPS).

11. A method of controlling a power supply system comprising an input configured to receive input power from an input power source, an output configured to provide output power to a load, a power factor correction circuit coupled to the input, an inverter having an input connection coupled to the power factor correction circuit and an output connection coupled to the output, a bus coupled to the power factor correction circuit and the inverter, a switching circuit coupled to the inverter, and a controller, the method comprising:
   determining one or more environmental parameters of the power supply system; and
   based on determining, providing control signals to operate the switching circuit in a first mode of operation to direct AC power from the input to the input connection of the inverter, bypassing the bus, and a second mode of operation to simultaneously direct AC power from the input to the input connection of the inverter and DC power from the bus to the input connection of the inverter.

12. The method of claim 11, wherein operating the switching circuit in the first mode of operation comprises directing an alternating current from the power factor correction circuit to the inverter, bypassing the bus.

13. The method of claim 11, wherein providing control signals includes providing control signals to operate the switching circuit in at least one of the first mode of operation, the second mode of operation, and a combination of the first and second modes of operation based on the one or more environmental parameters.

14. The method of claim 13, wherein providing control signals includes providing control signals to the switching circuit to regulate input power and output power of the power supply system to desired levels based on the one or more environmental parameters.

15. The method of claim 13, wherein providing control signals includes providing control signals to the switching circuit to adjust a duty-cycle of the switching circuit to control an amount of power being transferred between the power factor correction circuit, the bus, and the inverter.

16. The method of claim 11, wherein determining one or more environmental parameters comprises receiving an input voltage value and an output voltage value and determining whether the input voltage value and the output voltage value are substantially the same, and wherein providing control signals comprises providing, in response to determining that the input voltage value and the output voltage value are substantially the same, control signals to operate the switching circuit in the first mode of operation.

17. The method of claim 11, wherein determining one or more environmental parameters comprises monitoring an input current of the power factor correction circuit and providing control signals comprises determining whether the input current of the power factor correction circuit is less than an expected inverter output current level and providing, in response to determining that the input current of the power factor correction circuit is less than the expected inverter output current level, control signals to operate the switching circuit to direct current from the bus to the inverter to boost an output current of the inverter.

18. The method of claim 11, wherein the power supply system further comprises an energy storage component coupled to the bus, the method further comprising directing current to and from the energy storage component.

19. The method of claim 11, wherein the power supply system comprises an uninterruptible power supply (UPS).

20. A power supply system comprising:
an input configured to receive input power from an input power source;
an output configured to provide output power to a load;
a power factor correction circuit coupled to the input;
an inverter having an input connection coupled to the power factor correction circuit and an output connection coupled to the output;
a bus coupled to the power factor correction circuit and the inverter; and
means for operating the power supply system in a hybrid mode to generate desired input and output power of the power supply system, the hybrid mode including providing AC power from the input to the input connection of the inverter and bypassing the bus at a first time, and simultaneously providing AC power from the input to the input connection of the inverter and providing DC power from the bus to the input connection of the inverter at a second time.

* * * * *